(12) United States Patent
Edrenkin (10) Patent No.: US 11,481,632 B2
(45) Date of Patent: Oct. 25, 2022

(54) CLASSIFICATION APPARATUS AND METHOD FOR OPTIMIZING THROUGHPUT OF CLASSIFICATION MODELS

(71) Applicant: i2x GmbH, Berlin (DE)

(72) Inventor: Ilya Edrenkin, Berlin (DE)

(73) Assignee: I2X GMBH, Berlin (DE)

( * ) Notice: Subject to any disclaimer, the term of this patent is extended or adjusted under 35 U.S.C. 154(b) by 812 days.

(21) Appl. No.: 16/432,234

(22) Filed: Jun. 5, 2019

(65) Prior Publication Data

US 2020/0380355 A1    Dec. 3, 2020

(30) Foreign Application Priority Data

May 29, 2019  (EP) .................................... 19177267

(51) Int. Cl.
| | |
|---|---|
| *G06N 3/08* | (2006.01) |
| *G06N 3/04* | (2006.01) |
| *G06N 3/00* | (2006.01) |
| *G06N 7/00* | (2006.01) |
| *G06F 40/40* | (2020.01) |

(52) U.S. Cl.
CPC ............ *G06N 3/082* (2013.01); *G06N 3/006* (2013.01); *G06N 3/0445* (2013.01); *G06N 3/0454* (2013.01); *G06N 7/005* (2013.01); *G06F 40/40* (2020.01); *G06N 3/08* (2013.01)

(58) Field of Classification Search
CPC ...... G06N 3/082; G06N 3/006; G06N 3/0445; G06N 3/0454; G06N 7/005; G06N 3/08; G06N 3/0481; G06F 40/40
USPC .......................................................... 706/20
See application file for complete search history.

(56) References Cited

U.S. PATENT DOCUMENTS

| | | | |
|---|---|---|---|
| 2016/0117587 A1* | 4/2016 | Yan ...................... | G06N 3/0454 706/20 |
| 2019/0147296 A1* | 5/2019 | Wang ................. | G06V 30/2504 382/157 |

\* cited by examiner

*Primary Examiner* — Fitwi Y Hailegiorgis
(74) *Attorney, Agent, or Firm* — Foley & Lardner LLP (57) ABSTRACT

A classification apparatus is configured to perform a classification using a neural network with at least one hidden layer and an output layer, wherein the classification apparatus comprises a coarse training unit configured to train the neural network on a subset of neurons of a last hidden layer and a set of neurons of the output layer; and a fine training unit configured to train the neural network on a set of the last hidden layer and a subset of neurons of the output layer. By executing the classification apparatus, training of a classification model can be improved by reducing the computational burden of the classification, speeding up the training time of a classification model, and speeding up the inference time during application of the classification model.

16 Claims, 9 Drawing Sheets

CLASSIFICATION APPARATUS AND METHOD FOR OPTIMIZING THROUGHPUT OF CLASSIFICATION MODELS

CROSS-REFERENCE TO RELATED PATENT APPLICATION

This patent application claims priority to and the benefit of European Patent Application No. 19177267.2, filed May 29, 2019, which is incorporated herein by reference in its entirety.

The present disclosure relates to apparatuses and methods performing classification. In particular, the present disclosure relates to a classification apparatus and classification method performing classification using a neural network.

BACKGROUND

Classification models deal with the problem of determining probabilities of objects belonging to certain classes. In this matter, one type of classification model dealing with classification problems are autoregressive models using chain rule decomposition of the joint probability of a sequence, in particular language models.

Language models may attempt to determine the probability of sequences of words, wherein a language model may learn a probability of what the next word in a specific sequence/text/sentence could be. In order to do so, the probability of each word in a vocabulary set being the next word in a sequence may be computed, wherein the vocabulary set may represent an entire dictionary, or a specific domain restricted sample of words.

One drawback of language models is that they are particularly complex due to a very large number of classes in which words with, for example, similar meanings, attributes, roots, etc. are sorted or divided for classification. In addition, the size of the vocabulary set is a bottleneck for training the classification model. To get a well-trained language model, a large number of words has to be included in the vocabulary set. For example, if a language model attempts to predict the next word in a sequence from a preselected vocabulary set, the vocabulary set can easily contain more than 1,000,000 words leading to an increased computational burden and low throughput.

The complexity problem of classification models, in particular of language models, has been heavily studied since the beginning of at least the early 2000s. In this matter, the prior art mostly concentrates on reducing the computational time of training classification models, like language models, by varying the dimensions of the input and output. For language models, for example, the prior art concentrates on limiting the vocabulary set in order to reduce the computational time of training language models. Reducing the vocabulary set, however, also leads to a reduced capacity of the language model. In the best-case scenario, the methods and apparatuses of the prior art improve the training time by order of 10 times.

SUMMARY OF THE INVENTION

The aim of the present solution is to solve the problem concerning the training of classification models. In particular, the present solution proposes a classification apparatus and classification method for improving training of a classification model by reducing the computational burden of the classification and speeding up the training time of a classification model, while optimizing the throughput of the classification model and ensuring the quality, accuracy, efficiency, and preciseness of classification. In the case of language models, the aim of the present invention is improving training and throughput of a language model which evaluates a probability measure for all words in a vocabulary without limiting the vocabulary set, while reducing the computational burden of the language classification, and speeding up the training time and inference time of the language model, wherein accurate and precise results of the language model are achieved.

It is desired to provide means for improved classification which reduce the computational burden of the classification, speed up the training time of the classification model, speed up the inference time during application of the classification model, optimize the throughput of the classification model, and ensure accurate and precise classification results.

At least some of the mentioned objects and drawbacks are solved by the subject matter of the independent claims. Further embodiments are defined in the dependent claims.

According to one aspect of the present solution, a classification apparatus is configured to perform a classification using a neural network with at least one hidden layer and an output layer. The classification apparatus comprises a coarse training unit configured to train the neural network on a subset of neurons of a last hidden layer and a set of neurons of the output layer; and a fine training unit configured to train the neural network on a set of the last hidden layer and a subset of neurons of the output layer. The subset of neurons of the last hidden layer comprises a smaller number of neurons than the set of neurons of the last hidden layer, and the subset of neurons of the output layer comprises a smaller number of neurons than the set of neurons of the output layer. Accordingly, the computational burden of performing classification can be decreased, and speeding up of the training time and of the inference time during application of the classification model can be achieved, while accurate classification results can be obtained.

According to another aspect of the present invention, a classification method for performing a classification using a neural network with at least one hidden layer and an output layer comprises a coarse step of training the neural network on a subset of neurons of a last hidden layer and a set of neurons of the output layer; and a fine step of training the neural network on a set of neurons of the last hidden layer and a subset of neurons of the output layer. The subset of neurons of the last hidden layer comprises a smaller number of neurons than the set of neurons of the last hidden layer, and the subset of neurons of the output layer comprises a smaller number of neurons than the set of neurons of the output layer. Accordingly, the computational burden of performing classification can be decreased, and speeding up of the training time and decreased inference time during application of the classification model can be achieved, while accurate classification results can be obtained.

According to another aspect of the present solution, a computer program comprises instructions which, when the program is executed by a computer, cause the computer to carry out the steps of the above described classification method for performing a classification.

Further advantageous features of the solution are disclosed in the claims.

DETAILED DESCRIPTION

Embodiments of the present disclosure are described with reference to the figures. It is noted that the following description contains examples only and should not be construed as limiting the present solution. In the following, similar or same reference signs indicate similar or same elements or functions.

Figure 1A:
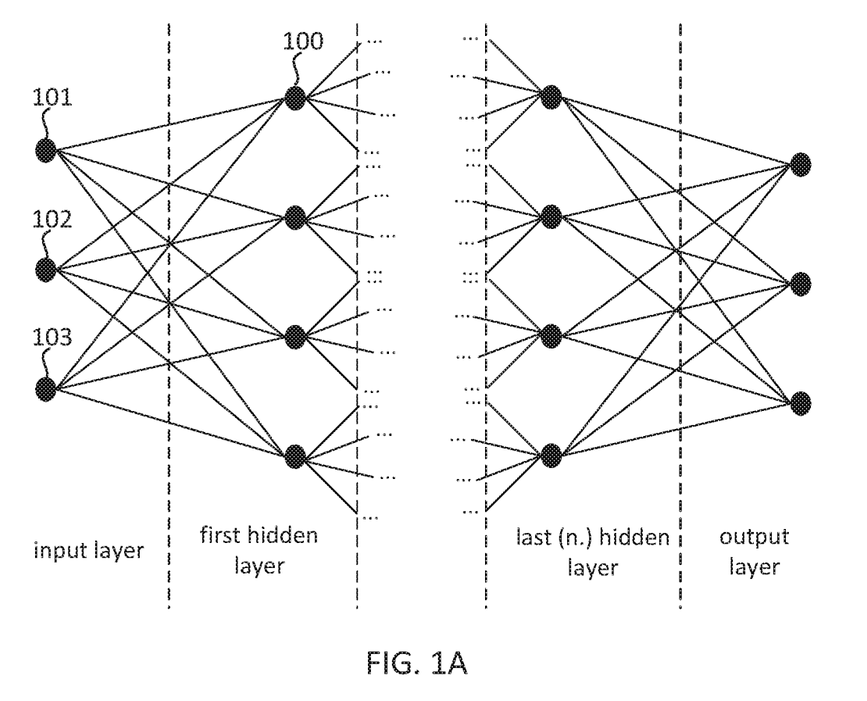
FIG. 1A is an illustration of a neural network comprising an input layer, several hidden layers, and an output layer.

FIG. 1A is an illustration of a general neural network comprising an input layer, several hidden layers, and an output layer. The neural network may comprise an input layer having at least one neuron, one or several hidden layers, each hidden layer usually having multiple neurons, and an output layer having again at least one neuron. In this matter, a neuron is a node of the neural network, wherein a collection of neurons, i.e. nodes, forms a layer, for example, an input layer, a hidden layer, or an output layer. In FIG. 1A, the input layer and the output layer each include three neurons, respectively. However, this is only illustrative, and the input layer and output layer of the neural network may comprise more or less neurons depending on the configuration, wherein the number of neurons in the input layer may vary from the number of neurons in the output layer. In this case, the first hidden layer having four neurons and the last hidden layer having four neurons are shown, wherein several additional hidden layers may be given between these two hidden layers. The neural network may also contain no hidden layer or may solely contain one hidden layer. Again, the number of hidden layers and the number of neurons for each hidden layer are only illustrative, and each hidden layer can have more or less neurons, the number of neurons for each hidden layer can vary depending on the configuration.

A neuron of the input layer provides information from the outside world to the network, wherein no computation is performed in any of the neurons of the input layer. The input layer solely passes on the information to the neurons in the hidden layer. If no hidden layers are given in the neural network, the input layer passes on the information to the output layer.

The neurons of the hidden layer have no direct connection with the outside world, such that the neurons are also called "hidden". These neurons perform computations and transfer information from the neurons of the input layer to the neurons of the output layer. A collection of hidden neurons forms a hidden layer, wherein a neural network may comprise one hidden layer between the input layer and the output layer, or may comprise more than one hidden layer depending on the complexity of the input data and neural network. The hidden layers are, for example, used when the neural network has to process complex, contextual, or non-obvious inputs received by the input layer. For instance, neural networks used for classification models and, in particular, for language models may comprise several hidden layers. If the data input to the neural network is not very complex, it is possible that the neural network may not comprise any hidden layers at all.

The output layer is responsible for computing the end result.

Each neuron may receive input from some other nodes or from an external source and computes an output. Each neuron may have an associated neutral, positive, or negative weight w assigned to minimize a chosen loss function on a given training dataset. Each layer may apply a function f to the inputs to calculate its output. The function f may be non-linear and may be called activation function. The purpose of the activation function is to introduce non-linearity into the output of a neuron to represent data received by the input layer and processed by the neural network. There are several activation functions given in the prior art (linear, sigmoid, hyperbolic tangent, softmax, etc.) which may be chosen depending on the configuration and purpose of the neural network.

Figure 1B:
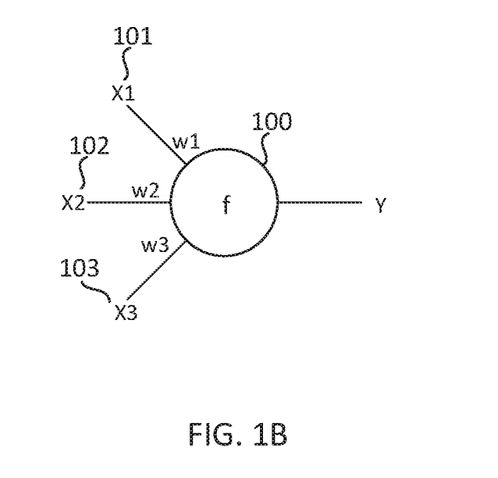
FIG. 1B is an illustration of a neuron of a neural network.

FIG. 1B is an illustration of a neuron 100 of the neural network illustrated in FIG. 1A. In this case, the neuron 100 is a hidden neuron of the first hidden layer of the neural network of FIG. 1A and is connected to three neurons 101, 102, and 103 of the input layer of the neural network of FIG. 1A. The neuron 100 receives three input values X1, X2, and X3 from the neurons 101, 102, and 103, wherein each input is associated with one of the weights w1, w2, and w3. The neuron 100 then applies the activation function f to calculate its output Y. The activation function f may use as inputs the weighted sum of its inputs as shown below:

$$Y=f(w1*X1+w2*X2+w3*X3).$$

The neuron 100 then outputs its calculated output Y to the neurons of the subsequent layer to which the neuron 100 is connected. In this case, the neuron 100 may output its calculated output Y to neurons of the second hidden layer to which the neuron 100 is connected for further processing.

FIG. 1A shows a feedforward neural network, where the information moves in only one direction from the input layer through the hidden layers to the output layer. The neural network may, however, also be a recurrent neural network comprising cycles or loops.

Training a neural network may mean calibrating the weights w associated with the inputs of the neurons. In the beginning, initial weights may be randomly selected based on, for example, Gaussian distribution. The process for training a neural network may then be repeated multiple times on the initial weights until the weights are calibrated using the backpropagation algorithm to accurately predict an output.

A general neural classification model architecture may use a neural network as shown in FIGS. 1A and 1B or may use a recurrent neural network, or a transformer neural network being used especially for language models with regard to translations. The computational complexity of the neural classification model is mostly dominated by the fully connected last hidden layer having N neurons typically in the order of hundreds, and the output layer having V neurons typically in the order of millions. When training the parameters in these two layers, for example the weights w associated with these two layers, O(N*V) operations may be performed during training. As mentioned above, as N may be a value in the order of hundreds and V may be a value in the order of millions, the number of operations used for training may be quite high leading to increased computational burden and extremely long training times of the classification model. If, however, the number of neurons in the last hidden layer and/or the number of neurons of the output layer are reduced in order to decrease computational burden and training times, the throughput and capacity of the classification model is also reduced, and the quality, accuracy, efficiency, and/or preciseness of classification is impaired.

Thus, in order to significantly reduce the number of operations for training the neural classification model without losing performance, i.e. reducing the computational burden of the classification, speeding up the training time of the classification model, and speeding up the inference time during application of the classification model, while optimizing the throughput and ensuring the quality, accuracy, efficiency, and/or preciseness of classification, a classification apparatus according to an embodiment is given.

Figure 2:
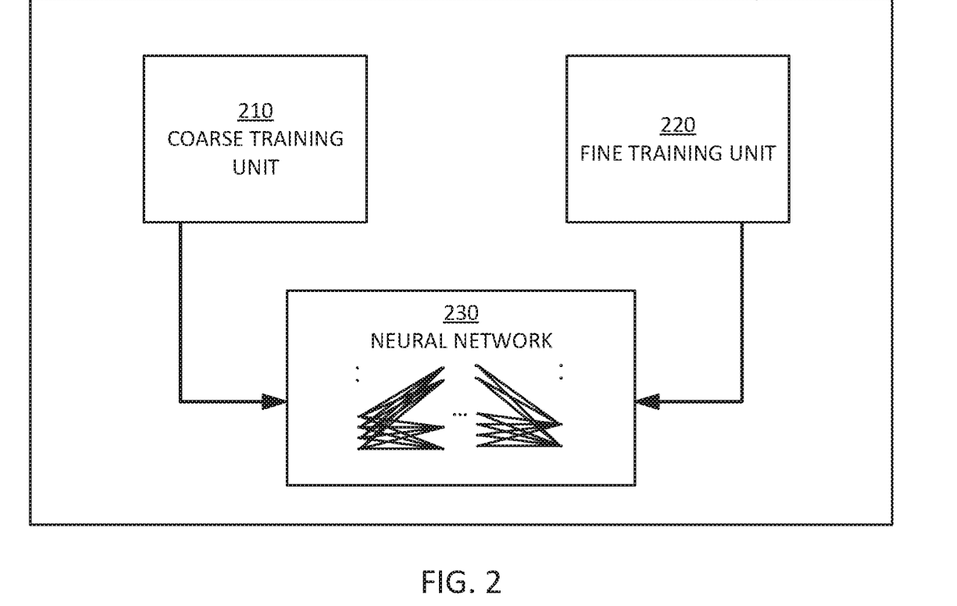
FIG. 2 shows an implementation of a classification apparatus according to an embodiment.

The classification apparatus according to an embodiment is configured to perform a classification using a neural network. FIG. 2 shows an implementation of the classification apparatus 200 according to an embodiment. The classification apparatus 200 comprises a coarse training unit 210, a fine training unit 220, and a neural network 230, the neural network 230 being any type of neural network, for example feedforward neural network, recurrent neural network, transformer network, long short-term memory (LSTM) network, convolutional neural network, a multilayer perceptron, or any other type of neural network depending on the type of classification to be performed (see, for example, also FIGS. 1A and 1B for the neural network 230). The layers of the neural network 230 may be, for example, LSTM layers, convolutional layers of a convolutional neural network, or hidden layers of a multilayer perceptron network based on a classification task. The classification apparatus 200 may be a computer device, wherein the coarse training unit 210 and the fine training unit 220 may be implemented on a single processor or on multiple processors or any programmable computing platform, and wherein the neural network 230 may be stored on a memory. Before having been trained, the neural network 230 may be assigned with initial weights being randomly selected based on, for example, Gaussian distribution.

According to an embodiment, the coarse training unit 210 is configured to train the neural network on a subset of neurons of the last hidden layer and a set of neurons of the output layer. As explained above, the neurons are nodes of the neural network and the last hidden layer is the hidden layer right before the output layer, i.e. the last hidden layer is defined as the hidden layer being connected to the output layer. If the neural network solely comprises one hidden layer, this hidden layer is also the last hidden layer.

The fine training unit 220 is configured to train the neural network on a set of the last hidden layer and a subset of neurons of the output layer. In this matter, the subset of neurons of the last hidden layer comprises a smaller number of neurons than the set of neurons of the last hidden layer, and the subset of neurons of the output layer comprises a smaller number of neurons than the set of neurons of the output layer. A more detailed description of the coarse training unit 210 and the fine training unit 220 is given with respect to FIGS. 3, 4A, and 4B.

Figure 3:
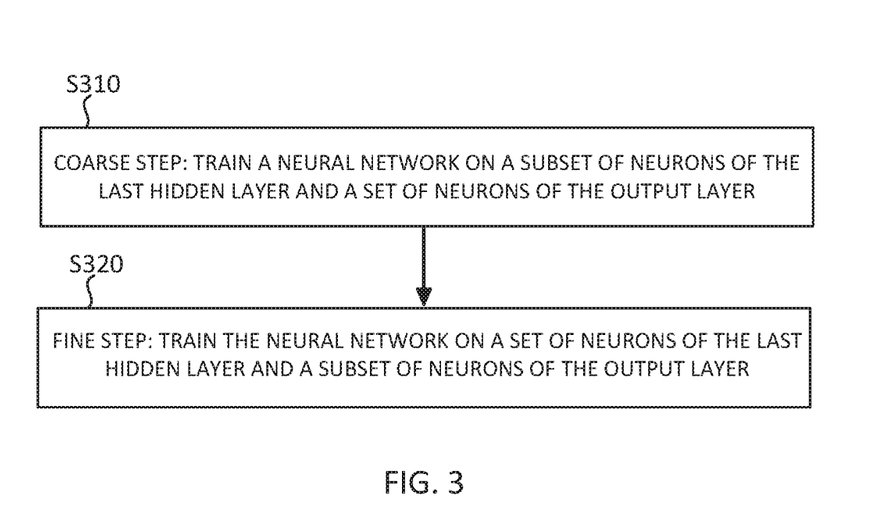
FIG. 3 shows a classification method performed by the classification apparatus according to an embodiment.

FIG. 3 shows a classification method performed by the classification apparatus 200 according to an embodiment. The classification method for performing a classification using the neural network 230 with at least one hidden layer and an output layer comprises a coarse step S310 of training the neural network 230 on a subset of neurons of the last hidden layer and a set of neurons of the output layer. The classification method further comprises a fine step S320 of training the neural network on a set of neurons of the last hidden layer and a subset of neurons of the output layer, the subset of neurons of the last hidden layer comprising a smaller number of neurons than the set of neurons of the last hidden layer, and the subset of neurons of the output layer comprising a smaller number of neurons than the set of neurons of the output layer.

Figure 4A:
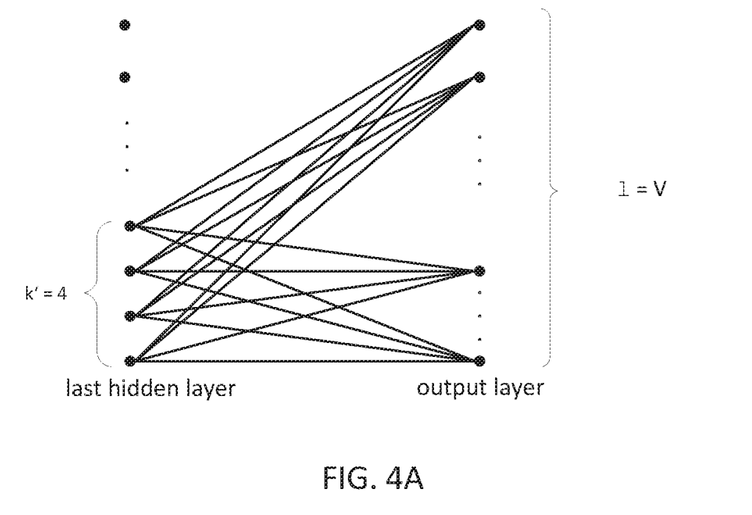
FIG. 4A is an illustration of coarse training a neural network according to an embodiment.

FIG. 4A is an illustration of coarse training a neural network according to an embodiment. Coarse training is performed by the coarse training unit 210 and may be also called coarse softmax. FIG. 4A shows the last hidden layer and the output layer of the neural network 230. During coarse training of the neural network 230, the coarse training unit trains the neural network on a subset of neurons k' of the last hidden layer and a set of neurons l of the output layer. The set of neurons l of the output layer may be the total number of neurons V of the output layer or a set of neurons smaller than the total number of neurons of the output layer. The subset of neurons k' of the last hidden layer may comprise a number of neurons of the last hidden layer smaller than a total number of neurons N of the last hidden layer. Again, the parameter V indicates the number of neurons of the output layer and the parameter N indicates the number of neurons of the fully connected last hidden layer.

In FIG. 4A, it is shown that the coarse training unit 210 trains the neural network 230 on k'=4 neurons of the last hidden layer and on l=V neurons of the output layer, i.e. the total number of neurons V of the output layer. Thus, the number of operations during coarse training is reduced to O(k'*V) operations which means that the coarse training unit 210 performs N/k' times less operations compared to the prior art.

Figure 4B:
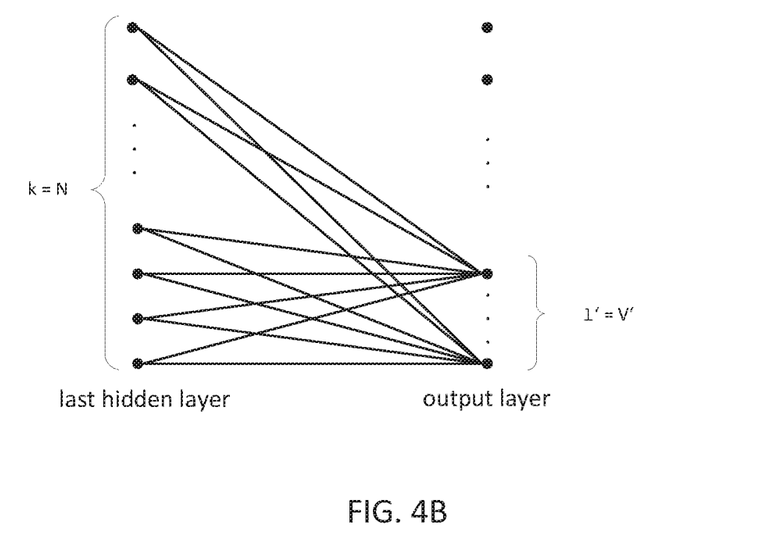
FIG. 4B is an illustration of fine training a neural network according to an embodiment.

FIG. 4B is an illustration of fine training a neural network according to an embodiment. Fine training is performed by the fine training unit 220 and may be called fine softmax. Again, FIG. 4B shows the last hidden layer and the output layer of the neural network 230. During fine training of the neural network 230, the fine training unit 220 trains the neural network 230 on a set of neurons k of the last hidden layer and a subset of neurons l' of the output layer. The set of neurons k of the last hidden layer may be the total number of neurons N of the last hidden layer or a set of neurons smaller than the total number of neurons of the last hidden layer. The subset of neurons l' of the output layer may comprise a number of neurons of the output layer smaller than the set of neurons l and the total number of neurons V of the output layer.

In FIG. 4B, it is shown that the fine training unit 220 trains the neural network 230 on k=N neurons of the last hidden layer, i.e. the total number of neurons N of the last hidden layer, and on l'=V' neurons of the output layer, V' being a subset consisting of a number of neurons smaller than the number of neurons in the set l and the total number of neurons V of the output layer. Thus, the number of operations during fine training is reduced to O(N*V') operations.

In one embodiment, the subset of neurons V' of the output layer is determined by a determination unit being included in the classification apparatus 200, wherein the fine training unit 220 trains the neural network on the set of neurons k of the last hidden layer and the determined subset of neurons l' of the output layer. The determination unit may be part of the fine training unit 220 or may be a single unit in the classification apparatus 200. The determination unit may comprise a partitioning unit and a selection unit, wherein the partitioning unit partitions the neurons of the output layer in subsets, and wherein the selection unit selects a subset which is used by the fine training unit 220 for training the neural network 230.

During training by the coarse training unit 210, each neuron $v_i \in l$ of the set of neurons l of the output layer may be assigned to a coarse probability $P_c(v_i)$, wherein the coarse probability may be an output result of the coarse training unit 210. Similar to the calculations performed in the neural network of FIGS. 1A and 1B, the coarse probability $P_c(v_i)$ may be calculated in each neuron $v_i$ of the output layer by using an activation function f. The activation function f may be a softmax function outputting probabilities summing up to one, and may use as inputs the weighted sum of the $m_c$ inputs of each neuron $v_i$ of the set of neurons l of the output layer during coarse training as shown below:

$$P_c(v_i) = f(\Sigma_i^{m_c} wi*Xi)$$

In the beginning of training the classification model, initial weights randomly selected by, for example, Gaussian distribution.

While the coarse training is not enough to provide precise and accurate results for the probabilities $P_c(v_i)$ of each neuron $v_i$ of the output layer of the neural network 230, it is possible to determine subsets of the neurons of the output layer after performing coarse training. Thus, the determination unit may determine a subset of neurons of the output layer based on the coarse probabilities of the neurons of the output layer computed by the coarse training unit 210.

In one example, the fine training unit 220 is then able to assign, during fine training of the neural network 230, a fine probability $P_f(v_i)$ to each neuron $v_i \in l_i$ of the output layer in the subset of neurons l', the fine probability $P_c(v_i)$ having a higher probability distribution accuracy than the coarse probability $P_c(v_i)$ and being an output result of the fine training unit 220. Again, similar to the calculations performed in the neural network of FIGS. 1A and 1B, the fine probability $P_f(v_i)$ may be calculated in each neuron $v_i$ of the subset of neurons l' of the output layer by using the activation function f. For example, the activation function f uses as inputs the weighted sum of the $m_f$ inputs of each neuron $v_i$ of the subset of neurons l' of the output layer as shown below:

$$P_f(v_i) = f(\Sigma_i^{m_f} wi*Xi).$$

As the amount of inputs $|m_f|$ for each neuron of the output layer during fine training is higher than the amount of inputs $|m_c|$ for each neuron of the output layer during coarse training due to more hidden neurons being used for fine training compared to coarse training (k=N for fine training compared to k'<N for coarse training), the probability distribution accuracy of the fine probabilities $P_f(v_i)$ is higher compared to the probability distribution accuracy of the coarse probabilities $P_c(v_i)$.

Figure 5A:
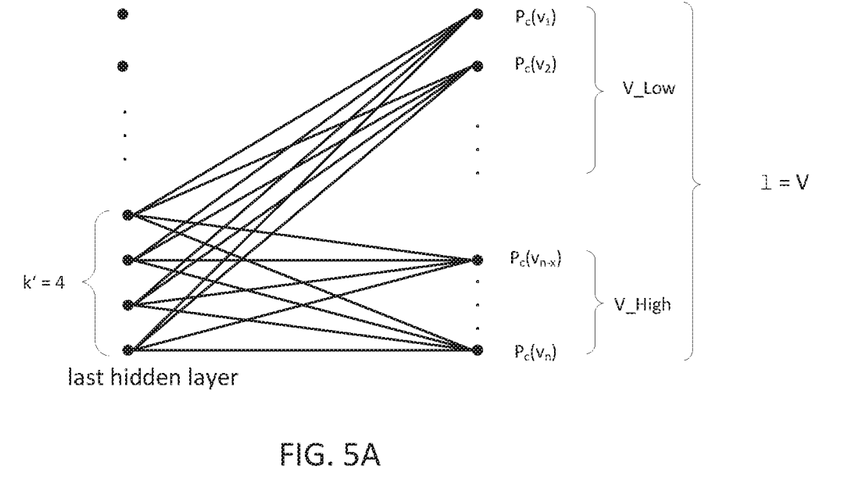
FIG. 5A illustrates the assignment of coarse probabilities to neurons of the output layer of a neural network.
Figure 5B:
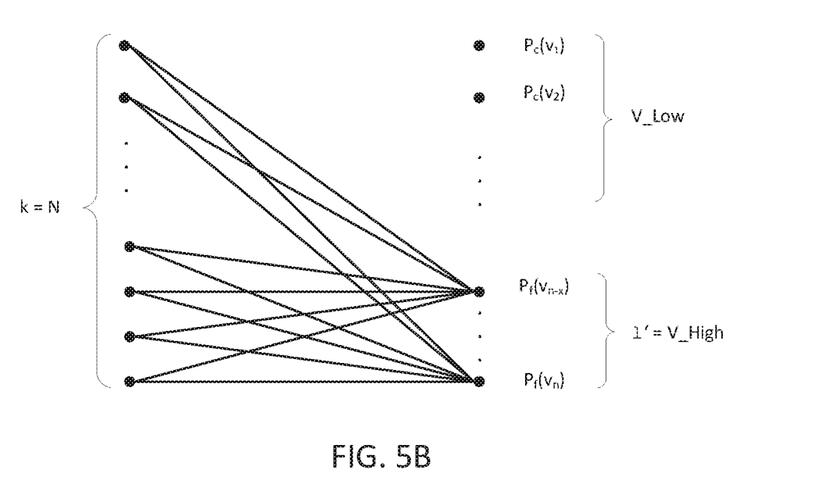
FIG. 5B illustrates the assignment of fine probabilities to neurons of the output layer of a neural network.

FIGS. 5A and 5B illustrate the assignment of coarse and fine probabilities to the neurons of the output layer and an embodiment of determining a subset of neurons l' of the output layer used by the fine training unit 220 for fine training of the neural network 230. FIGS. 5A and 5B show the same configuration as FIGS. 4A and 4B, thus the last hidden layer and the output layer of the neural network 230.

In FIG. 5A, the coarse training by the coarse training unit 210 is illustrated, wherein the coarse training unit 210 trains the neural network 230 on k'=4 neurons of the last hidden layer and on l=V neurons of the output layer, i.e. the total number of neurons V of the output layer. Any other configuration for k' and l may be chosen, and the present solution is not limited to k'=4 and l=V.

According to an embodiment, the coarse training unit 210 assigns coarse probabilities $P_c(v_i)$ to each neuron of the set of neurons l of the output layer during coarse training. The coarse probabilities are calculated by the activation function f and the weights w assigned to each neuron. The activation function f is for example, a softmax function.

Then, the determination unit may determine subsets of neurons of the output layer based on the calculated coarse probabilities assigned to the neurons of the output layer. The determination unit may partition the set of neurons l of the output layer in a first subset V_High and in a second subset V_Low, wherein each neuron of the first subset V_High may have a higher coarse probability than each neuron of the second subset V_Low.

As illustrated in FIG. 5B, the fine training unit 220 then performs fine training on the neural network 230, wherein the fine training unit 220 may train the neural network 230 on the on k=N neurons of the last hidden layer and on a subset l' being a subset of the set of neurons l of the output layer. For example, the fine training unit 220, selects the first subset V_High and train the neural network 230 on the set of neurons k of the last hidden layer and the selected first subset V_High.

During fine training, the fine training unit 220 may assign fine probabilities $P_f(v_i)$ to each neuron of the subset of neurons l' of the output layer. As illustrated in FIG. 5B, the fine training unit 220 assigns the fine probabilities $P_f(v_i)$ to the first subset V_High consisting of neurons of the output layer, while the neurons of the second subset V_Low maintain the coarse probabilities $P_c(v_i)$. The fine probabilities are again calculated by the activation function f and the weights w assigned to each neuron. The activation function f may be a softmax function.

It is to be noted that in FIGS. 5A and 5B, the neurons are sorted, such that the neurons of the subset V_Low are the first neurons of the output layer, and the neurons of the subset V_High are arranged below the subset V-Low. In FIGS. 5A and 5B, the first neuron of the output layer being included in the subset V_High is defined as $v_{n-x}$, wherein the last neuron of the output layer being included in the subset V_High is defined as $v_n$. However, it is also possible that the neurons are not sorted and that the neurons of the output layer cannot be divided as illustrated.

As explained above, the neurons of the output layer may be formed to subsets before being trained by the fine training unit 220 based on the coarse probabilities assigned to the neurons of the output layer by the coarse training unit 210. According to one embodiment, a part of the neurons of the output layer forms a subset when, for example, a cumulative probability exceeds a threshold $T_h$, wherein the cumulative probability is determined by cumulating the coarse probabilities of the neurons.

Figure 6:
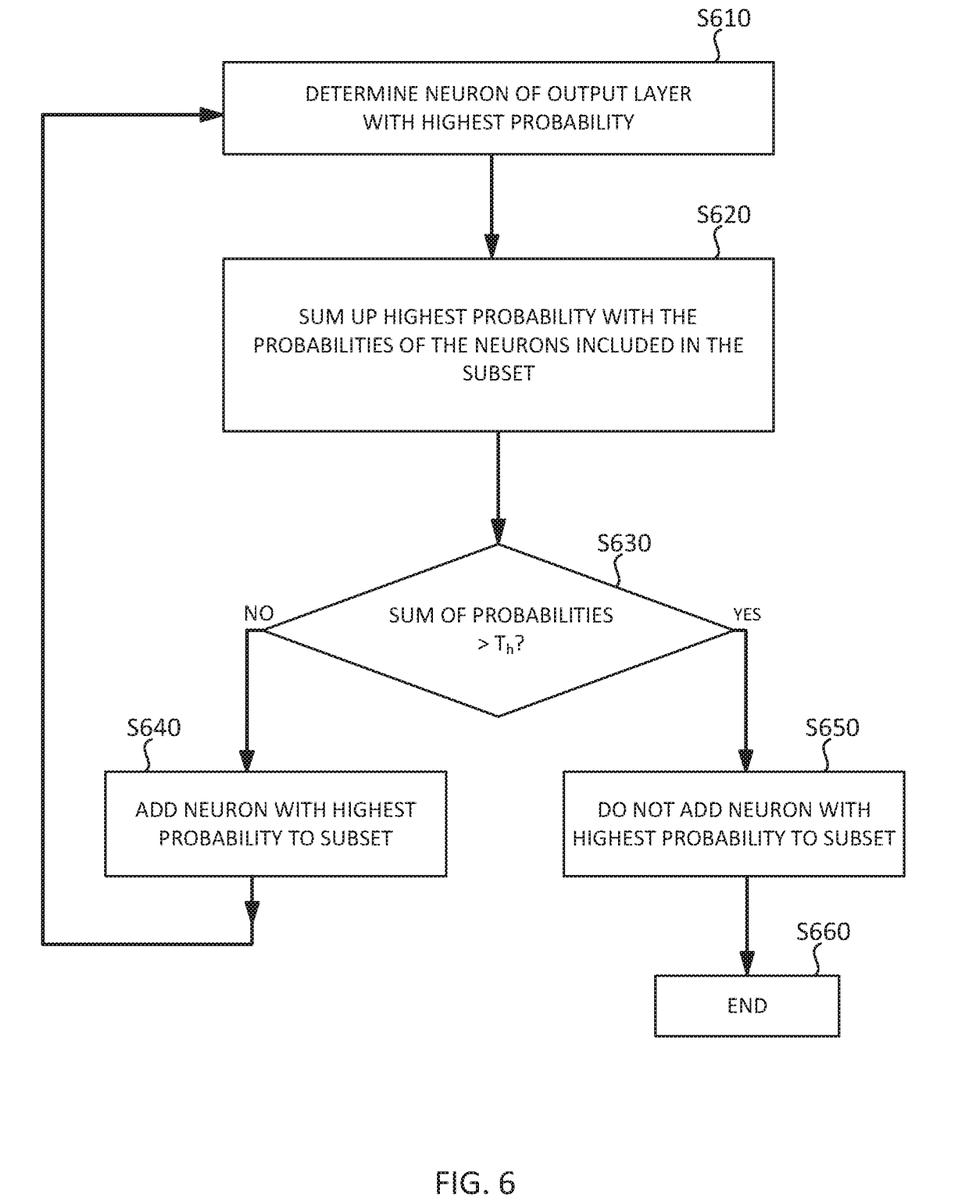
FIG. 6 illustrates a flowchart showing an embodiment for forming a subset of neurons of the output layer for fine training.

FIG. 6 illustrates a flowchart showing an embodiment for forming a subset of neurons of the output layer for fine training. For example, the threshold $T_h$ is set to 99%, 98%, or any other value beforehand, e.g. by a user operating the classification apparatus 200 or during manufacturing. In step S610, the classification apparatus first determines the neuron of the output layer with the highest coarse probability in the set of neurons l not yet included in the subset to be formed.

In step S620, the classification apparatus 200 then sums up the highest coarse probability obtained from the neuron determined in step S610 with the coarse probabilities of the neurons already included in the subset to be formed. If no neuron has been added to the subset yet, step S620 can be omitted.

Afterwards, the sum of probabilities calculated in step S620 (or the highest probability of the neuron if no neuron has been added to the subset V_High yet) is compared to the predefined threshold $T_h$ in step S630. If the sum of probabilities (or the highest probability if no neuron has been added to the subset V_High yet) does not exceed the threshold $T_h$ (NO in step S630), the process of FIG. 6 proceeds to step S640 and the neuron with the highest coarse probability is added to the subset V_High. Then, the classification apparatus returns to step S610 and the neuron with the highest probability of the output layer not yet included in the subset V_High is determined to execute the steps of FIG. 6.

If the sum of probabilities (or the highest probability if no neuron has been added to the subset V_High yet) exceeds the threshold $T_h$ (YES in step S630), the process of FIG. 6 proceeds to step S650 and the neuron with the highest coarse probability is not added to the subset V_High. The process then ends in step S660, wherein the neurons added to the subset V_High form the subset V_High used, for example, for fine training of the neural network 230.

The steps illustrated in FIG. 6 are, for example, performed by the determination unit of the classification apparatus 200 or are performed by any other suitable unit of the classification apparatus 200. When determining the subset V_High, the normalization of the probabilities over all neurons of the output layer is to be performed. It is solely allowed to redistribute specified amounts of the probability mass that is equal to the sum of the estimated probabilities for the subset V_High and is equal to or greater than the cumulative probability threshold Th.

If the classification apparatus 200 is used for language models to determine the probability of sequences of words, wherein the classification apparatus 200 may be used to learn a probability of what the next word in a specific sequence/text/sentence could be, each neuron $v_i$ of the output layer may represent a word from a vocabulary set. In this matter, the probabilities assigned to each neuron of the output layer may represent the likelihood that the word assigned to the neuron may be the next word in a sequence of words. Due to the fact that the conditional distribution of words follows Zipf's law, the size of V_High may be several orders of magnitude lower than the size of V_Low leading to a reduced amount of operations during fine training of the neural network 230 (O*V_High) operations for training according to the present solution instead of O(N*V) operations). Thus, the computational burden and training time of the neural network 230 is reduced.

Figure 7:
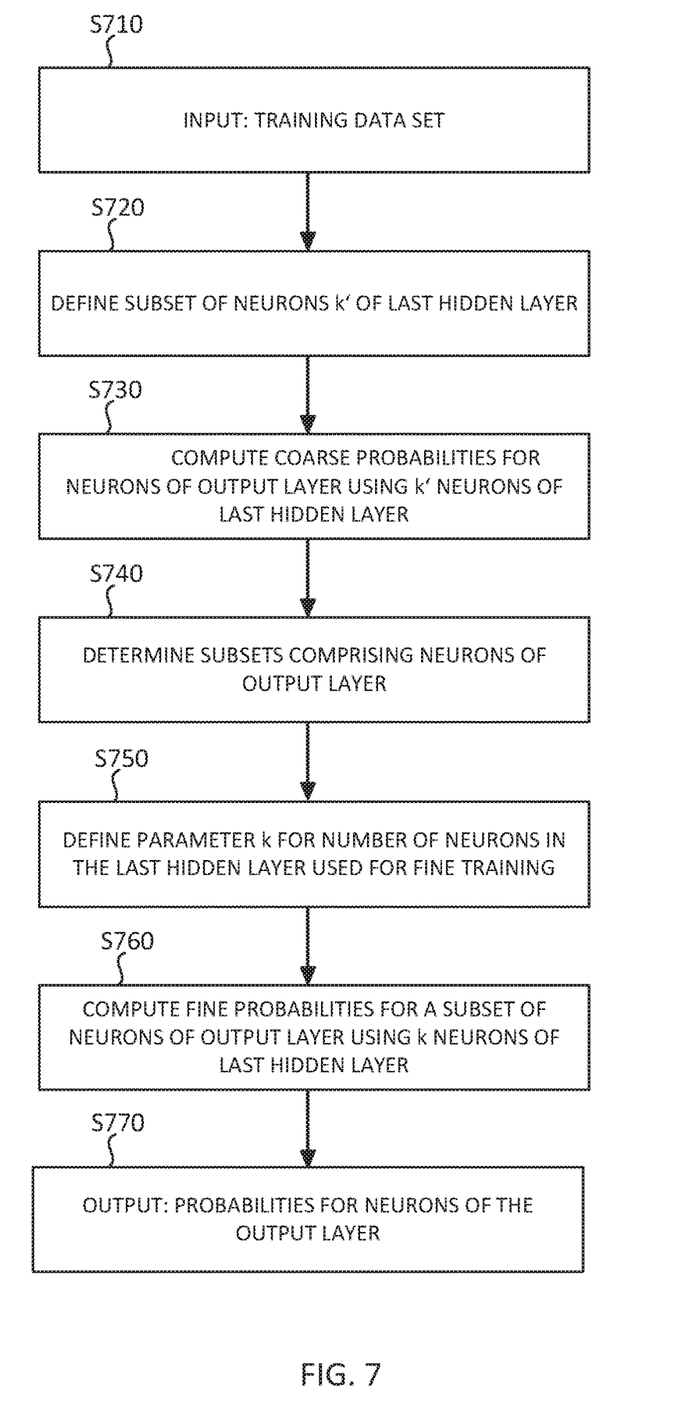
FIG. 7 illustrates an embodiment of a classification method performed by a classification apparatus.

FIG. 7 illustrates an embodiment of a classification method performed by the classification apparatus 200. The classification method is used to train the neural network 230 included in the classification apparatus 200.

For training the neural network 230, an input training dataset may be used which defines the type of output classification model. The input training dataset, i.e. the input classification training dataset, is, for example, a vocabulary set of an English encyclopedia or any other language encyclopedia or a vocabulary set of journal articles or any other type of text for language classification, Chinese characters, image parameters, discrete protein sequential values, DNA sequences, etc. depending on the field in which classification is to be used. The input training dataset may be pre-processed depending on the type of input before being used by the classification apparatus 200 and may be input in the classification apparatus 200 in step S710 of FIG. 7.

If the classification model is, for example, used in language classification, different methods of defining the elements that make up the input classification training dataset may need to be employed for different languages. For instance, the input classification training dataset may be made up of individual characters, subword units, phonemes, morphemes, spellnemes, or entire words. Each language that is modelled, or classification element, may require different pre-processing to organize the output layer into relevant segments. For instance, Turkish, Finnish & Hungarian languages are examples of agglutinative languages, and therefore the vocabulary domain can be infinite. As this may result in more difficult classification, the input classification training dataset may be pre-processed into subwords. For character based (logographic) languages, such as Chinese and Korean, the vocabulary dataset may be pre-processed to be divided into a character-based vocabulary.

Then, coarse training is performed in steps S720 and S730. The goal of coarse training is to partition the input dataset to reduce the size of the classification training dataset in order to reduce the computational burden and speed up the training time for classification. In language models, the size of the vocabulary set is reduced by partitioning the input dataset comprising of vocabularies. By reducing the size of the classification training dataset, the amount of operations required to return a precise probability distribution output for the classification training dataset in the fine training is reduced.

To reduce the size of the classification training dataset, for example the number of neurons V in the output layer, as illustrated in FIGS. 4A and 4B, or as illustrated in FIGS. 5A and 5B, every neuron of the output layer may be allocated with a probability distribution by the coarse training unit 210. In order to do so, a subset of neurons k' of the last hidden layer is defined in step S720 and the neural network 230 is trained based on the subset of neurons k' of the last hidden layer and the set of neurons l of the output layer, wherein the set of neurons l may comprise the total number of neurons of the output layer. The value k' for defining the subset of neurons of the last hidden layer may be set manually by a user of the classification apparatus 200 or may be automatically determined in a separate training model. For example, as separate training model for determining the parameter k' for setting the number of neurons of the last hidden layer used by the coarse training unit 210, a reinforcement machine learning model is used. A large k' may result in a finer and more accurate calculation of the coarse probabilities and a more accurate probability distribution of the classification training dataset with a larger computational burden. The use of the term "coarse" in the present solution designates the fidelity or resolution of the probability distribution for the classification training dataset. The parameter k' may be configured to optimize the training of the model, and may vary based on the type of input dataset, hardware requirements, etc.

In step S730, the coarse probabilities for the classification training dataset, for example for words in a vocabulary set for language classification, are computed. For calculating the coarse probabilities, the classification apparatus 200 may use the subset of neurons k' of the last hidden layer and the set of neurons l of the output layer. The type of neural network 230, as described above, may be an LSTM, transformer network, or any recurrent neural network for language classification. For image classification, a convolutional neural network may be used, and for other general classification tasks a multilayer perceptron may be utilized. Generally, the type of neural network 230 is defined by the type of classification problem.

Then, in step S740, subsets comprising neurons of the output layer are determined. This may be, for example, done as explained in more detail with regard to FIG. 6. A sorting algorithm may be used to sort the classification training dataset, e.g. the vocabulary set of a language model, their coarse probabilities calculated by the coarse training unit 210. A threshold $T_h$ is defined by, for example, a user or during manufacturing of the classification apparatus 200, to partition the sorted classification dataset into subsets, for example subsets V_High and V_Low as explained above. The threshold may be determined on a case-by-case basis depending on the size and type of domain of the classification training dataset. According to an embodiment, the subset V_High contains the elements of the classification training dataset having the highest coarse probabilities adding up to the threshold $T_h$ (see also the description of FIG. 6). For a language model, the elements of the classification training dataset may be vocabulary elements, like words, characters, phonemes, phrases, sentences etc., that have the highest coarse probabilities adding up to the threshold Th. V_Low may then contain the rest of the classification training dataset not included in V_High. For the language model, the subset V_Low may contain the words having been assigned with low coarse probabilities by the coarse training unit 210, wherein the sum of the coarse probabilities of the words in V_Low is below the threshold Th.

As words in a vocabulary set for language classification may follow Zipf's law, it is ensured that the size of V_High is significantly smaller that the size of V_Low. Zipf's law roughly states that the frequency of words is inverse proportional to their ranking in the frequency table. Both subsets of the vocabulary can now be said to have associated coarse probability distributions. The coarse probability dataset of the subset V_Low is retained for further training the final classification model but is not processed by the fine training unit 220. Instead, the fine probability dataset of the subset V_High is further processed by the fine training unit 220 for a more accurate probability distribution to further train the classification model.

Thus, in step S760, the fine probabilities are computed for a subset of neurons of the output layer, i.e. for a subset of elements of the classification training dataset. In order to do so, the parameter k for the number of neurons in the last hidden layer used for fine training is, for example, defined in step S750. The parameter k is, for example, defined manually by a user of the classification apparatus 200 or during manufacturing, dependent on hardware configuration and capacity, the domain and size of the classification training dataset etc. Typical values for k are, for example, in the 1000's.

Afterwards, the fine probabilities are calculated by the fine training unit 220 in step S760. For example, the fine probabilities are calculated for the subset V_High. Fine probabilities are, for example calculated by the set of neurons k of the last hidden layer defined in step S750, which may be the total number of neurons of the last hidden layer, and are assigned to the subset of neurons l' of the output layer, e.g. to the subset V_High of the output layer.

At the final step S770, the coarse probabilities of V_Low and the fine probabilities of V_High are output.

The output coarse and fine probabilities assigned to the neurons of the output layer and thus to the classification training dataset may be used to calculate the weights of the neural network 230, e.g. calibrate the initial weights selected for the neural network 230 based on, for example, Gaussian distribution. While the coarse probabilities have a lower probability distribution accuracy than the fine probabilities, the coarse probabilities are still useful for calculating the weights.

Figure 8:
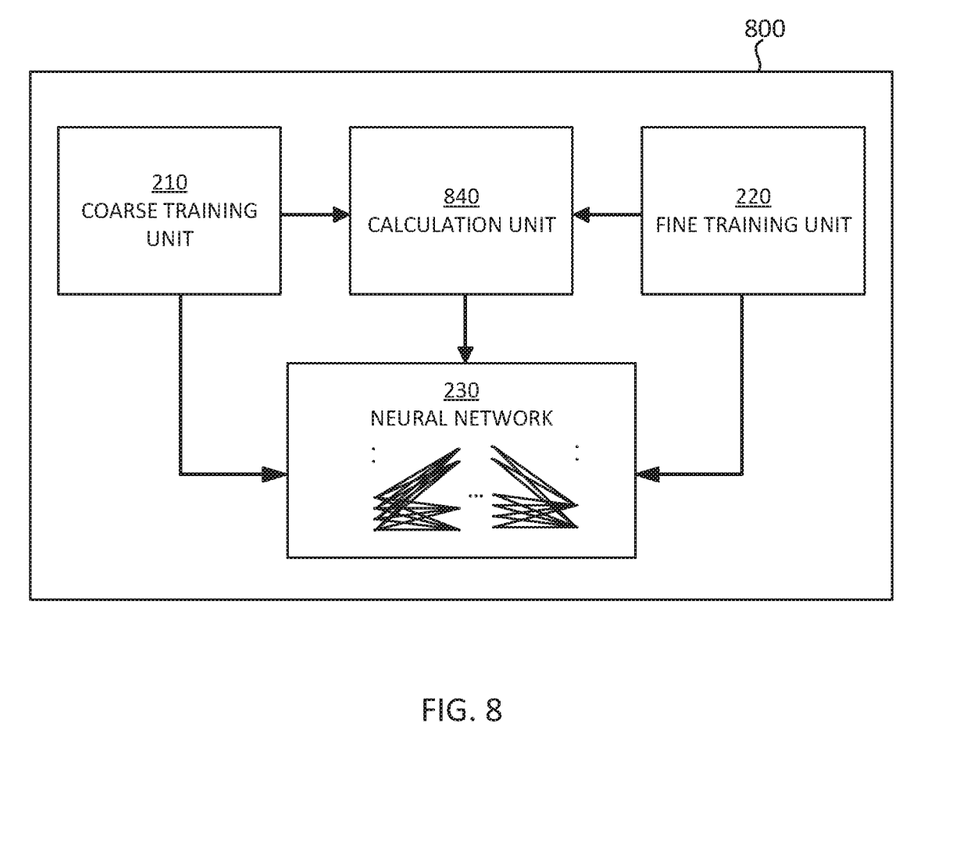
FIG. 8 shows an implementation of a classification apparatus according to another embodiment.

To calculate the weights of the neural network using the output results of the coarse training unit 210 and the fine training unit 220, a classification apparatus 800 is illustrated in FIG. 8 which comprises the coarse training unit 210 and the fine training unit 220 and a calculation unit 840. The coarse training unit 210 and the fine training unit 220 are identical to the units in the classification apparatus 200 and thus the same reference signs are used. A detailed description for the coarse training unit 210 and the fine training unit is omitted at this point for conciseness reasons. In addition, the classification apparatus 200 and the classification apparatus 800 perform identical processes, as for example described with regard to FIGS. 1A to 7, thus a detailed description of the classification apparatus 800 is also omitted at this point for conciseness reasons.

As stated above, the calculation unit 840 may calculate weights of the neural network 230 using the output results of the coarse training unit 210 and the fine training unit 220. The calculation unit 840 may calculate the weights of the neural network using, as the output results, the coarse probabilities and the fine probabilities assigned to the respective neurons of the output layer.

According to an embodiment, the weights of the neural network 230 are calculated with a joint loss function, wherein the joint loss function is a sum of a loss function of the coarse training unit 210 and a loss function of the fine training unit 220. As a loss function, which is also sometimes called error function, cross-entropy or any other loss function suitable for a classification task may be used. Minimizing the joint loss function is tantamount to minimizing each summand, i.e. minimizing both the loss function of the coarse training unit 210 and the loss function of the fine training unit 220, and hence coarse training and fine training is possible at the same time.

According to another embodiment, it is also possible to implement weight tying which means that the same parameters as input word embeddings are used. To implement weight tying, the concatenation of coarse and fine representations of words from projection matrices may be used.

Figure 9:
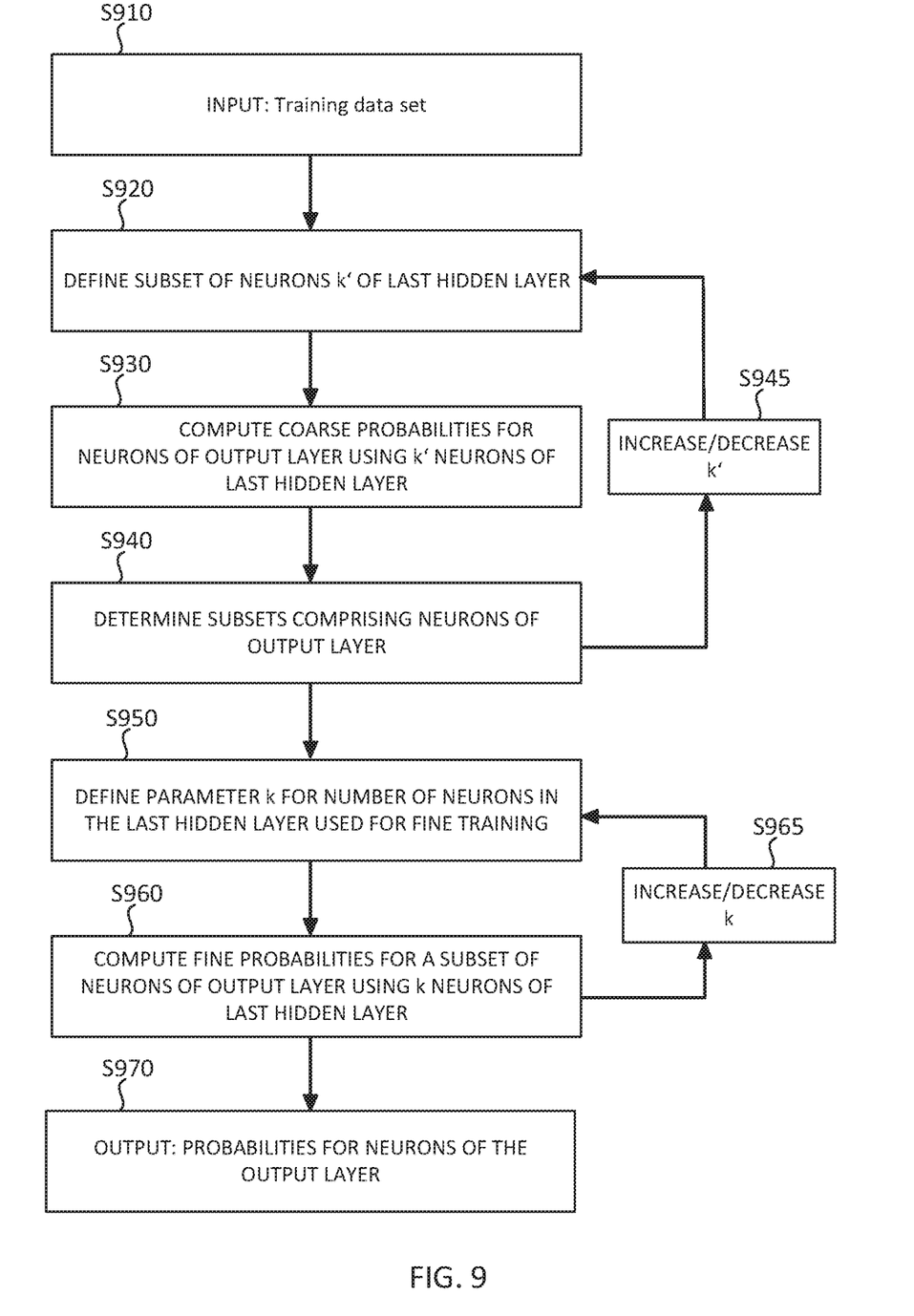
FIG. 9 illustrates another embodiment of a classification method performed by a classification apparatus.

FIG. 9 illustrates another embodiment of a classification method performed by the classification apparatus 200 or 800. The steps S910, S920, S930, S940, S950, S960, and S970 of FIG. 9 are equal to steps S710, S720, S730, S740, S750, S760 and S770 of FIG. 7 and thus a detailed description of these steps is omitted at this point for conciseness reasons.

As described with respect to step S720 of FIG. 7, in step S920 of FIG. 9 a subset of neurons k' of the last hidden layer is defined in order to perform coarse training of the neural network 230. For defining the parameter k', an iterative approach may be applied, wherein for the iterative approach the number of neurons of the last hidden layer in the subset k' for training the neural network by the coarse training unit 210 may be iteratively increased or decreased. For example, k' is manually or automatically defined in step S920 and is increased or decreased in step S945 after having computed the coarse probabilities in step S930 and having determined subsets comprising neurons of the output layer in step S940. In step S920, the subset of neurons k' is then defined based on the increased or decreased parameter k' and the steps S930 and S940 are repeated with respect to the newly defined parameter k'.

According to another embodiment, not only the parameter k' is gradually increased or decreased but also the number of neurons of the output layer in the subset for training the neural network by the fine training unit 220 is iteratively increased or decreased. For example, the threshold $T_h$ is gradually increased or decreased in order to decrease or increase the number of neurons in the subset V_High used by the fine training unit 220 to assign fine probabilities.

Moreover, as also described with respect to step S750 of FIG. 7, in step S950 of FIG. 9 the parameter k for the number of neurons in the last hidden layer used for fine training is defined. For defining the parameter k, an iterative approach may be also applied, wherein for the iterative approach the number of neurons of the last hidden layer in the set k for training the neural network by the fine training unit 220 may be iteratively increased or decreased. For example, k is manually or automatically defined in step S950 and is increased or decreased in step S965 after having computed the fine probabilities in step S960. In step S950, the set of neurons k is then defined based on the increased or decreased parameter k and step S960 is repeated with respect to the newly defined parameter k.

According to another embodiment, the increasing or decreasing of the parameter k may be also done together with gradually increasing or decreasing the threshold $T_h$ in order to decrease or increase the number of neurons in the subset V_High used by the fine training unit 220 to assign fine probabilities.

By using an iterative approach for the parameters of the classification method, the computational complexity is further decreased by further improving the accuracy and preciseness of the classification.

All dynamic variables or hyperparameters, for examples, the parameters k', k, Th, or number of iterations for the iterative approaches defined with respect to FIG. 9 may be automatically adjusted by implementing, for example, an additional reinforcement machine learning model. The technique for automating the search for optimal hyperparameters may be called neural architecture search (NAS). The set of all possibilities of choices of hyperparameters may form a "hyperparameter space", wherein the classification model may be trained for various choices of these hyperparameters. Then it may be moved in the hyperparameter space in the directions corresponding to decrease of performance. Thus, the implementation of the reinforcement model may be used to automatically adjust the architecture of the classification model. However, as described above, it is also possible to manually set these parameters, for example by a user operating the classification apparatus 200 or 800, or during manufacturing.

According to another embodiment, if the classification model is a language model, the classification model may be pre-trained with an n-gram language model. For example, the coarse training unit 210 uses a n-gram language model for language classification in order to further reduce the computational complexity of classification. By using a n-gram language model during coarse training, the selection of the subset V_High may be improved without being computationally heavy. In this case, the number of operations is reduced to O(V).

According to another embodiment, the activation function f used for the neural network 230 to compute the probabilities assigned to the neurons of the output layer may be a hierarchical softmax function or any other softmax-like activation function that outputs a valid probability distribution over words. For instance, the coarse training unit 210 uses hierarchical softmax or any other softmax-like activation function that outputs a valid probability distribution over words as activation function fin order to further reduce the computational complexity of the classification.

Now, an example for using the classification apparatus 200 or 800 is given for training a speech recognition model as classification model. The speech recognition model may require two independent models: an acoustic model and a language model. Acoustic models may use raw audio as an input into a preprocessing module which may convert the raw audio into a spectrogram or Mel Frequency Cepstral Coefficients (MFCC). Features may be extracted from the various representations of the raw audio, using the amplitude and frequency of the waveform. Together with the language model, these features may be used to output a decoded text, e.g. transcriptions.

The use of a model after training of the speech recognition model may be called inference, or, decoding. In a typical embodiment of a speech recognition model, there may be a compromise between the speed with which the model generates the decoded text and the complexity of the language model used during inference time. Thus, language models may usually use n-gram techniques, which, while being less complex, run faster. With the faster architecture of the classification apparatus 200 and 800 as described in the present solution, more complex acoustic and language model, can be used during inference while it is still possible to generate the transcript in a reasonable amount of time.

With the techniques as described with respect to the FIGS. 1A to 9, the language model, or any other classification model, has a reduced computational burden compared to a typical classification model of the prior art. In other words, the run mode of an application using the language model or any other classification model is able to make use of the available computational resources, wherein the run mode is performed after training the language model or any other classification model. In the case of a speech recognition application providing a speech recognition model that includes an acoustic model and a language model, the available computational resources can be directed to the acoustic model, because the language model is lighter on computational burden due to the techniques described with respect to the FIGS. 1A to 9. As more computational resources are available for the acoustic model, the acoustic model can be designed larger and more complicated and a decoding process can be performed more exhaustive, resulting in a more accurate and qualitative higher speech recognition application.

More generally, this speed up of real-time applications may be useful for any classification task with large enough number of classes. In robotics, for example, a robot has to take fast decisions on one of many (on the order of 10000) tasks, wherein a faster and more accurate real-time application is very useful. In other words, the inference step may be utilized in the same way for other classification tasks that may be applied in real-time, i.e. for robotics when robots are required to make real-time decisions between a very large classification sample.

Figure 10:
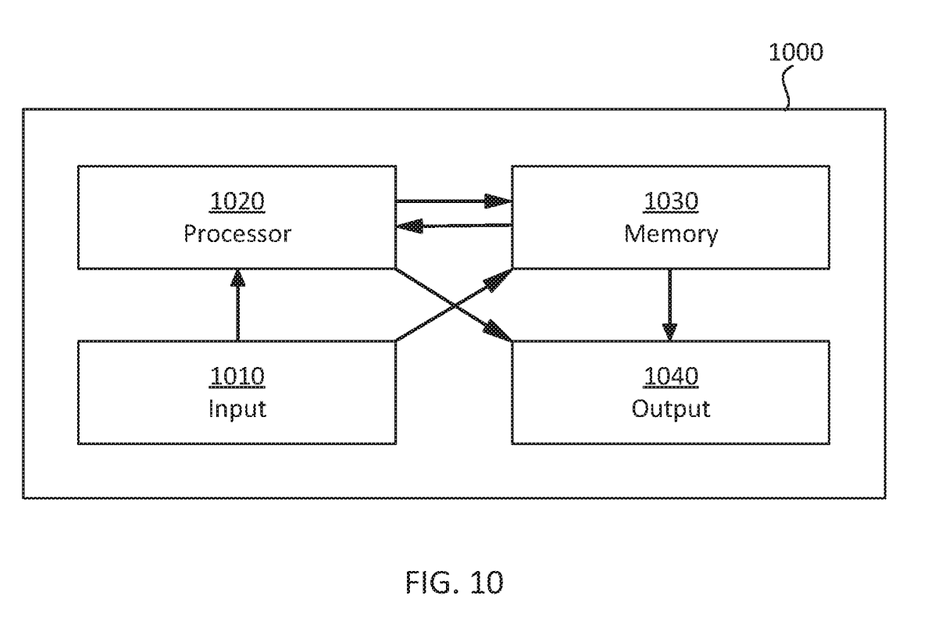
FIG. 10 shows a computing device for implementing a classification apparatus.

FIG. 10 shows a computing device 1000 for implementing the classification apparatus 200 or 800. The computing device 1000 comprises an input 1010, a processor 1020, a memory 1030, and an output 1040.

The input 1010 is, for example, used to input an input classification training dataset for training the neural network 230, or to input any other parameters used for the neural network, like the parameters k', k, l', l, Th, number of iterations, etc. The input 1010 may be a keyboard, mouse, Universal Serial Bus (USB) port, or any other unit for inputting data.

The units of the classification apparatus 200 or 800, e.g. the coarse training unit 210, the fine training unit 220, the determination unit, the calculation unit, etc. may be implemented on the processor 1020, wherein the processor 1020 is able to obtain the input classification training dataset and the parameters from the input 1010. The units of the classification apparatus 200 or 800 do not need to be implemented on one processor 1020 but may be also implemented on multiple processors.

The memory 1030 may be used to store the neural network 230 and any other data used for training the neural network 230, like parameters k', k, l', l, Th, number of iterations, etc. The data stored on the memory 1030 and obtained from the input 1010 may be delivered to the processor 1020 for training the neural network 230, wherein results from processing by the processor 1020 may again be stored on the memory 1030.

In addition, the memory 1030 may store a computer program to execute the classification methods described above, the classification methods being performed by the classification apparatus. The computer program comprises instructions which, when the program is executed by a computer, or by the computing device 1000, cause the computer to carry out the following steps: a coarse step of training the neural network on a subset of neurons of a last hidden layer and a set of neurons of the output layer; and a fine step of training the neural network on a set of neurons of the last hidden layer and a subset of neurons of the output layer, the subset of neurons of the last hidden layer comprising a smaller number of neurons than the set of neurons of the last hidden layer, and the subset of neurons of the output layer comprising a smaller number of neurons than the set of neurons of the output layer. According to another embodiment, the computer program may comprise instructions which cause the computer to carry out the steps described with respect to the FIGS. 1A to 9, particularly the steps described with respect to FIGS. 3, 6, 7, and 9.

The output 1040 is any output device to output or display the output results from classification. The output device 1040 is, for example, a display unit or any other unit showing the results of classification, for instance, the next word in a sequence of word being selected with the highest probability by the classification apparatus 200 or 800 in the case of language classification. The output 1040 may obtain the results to be output from the processor 1020 or the memory 1030.

By executing the classification apparatus 200 and 800 or performing the classification methods described with respect to FIGS. 1A to 10, training of a classification model can be improved by reducing the computational burden of the classification, speeding up the training time of a classification model, and speeding up the inference time during application of the classification model, while optimizing the throughput of the classification model and ensuring the quality, accuracy, efficiency, and/or preciseness of classification.

The classification apparatuses and methods herein are not limited to these scenarios as described in detail above. As described above, embodiments and examples of the present solution allow for improved classification.

It will be appreciated that various modifications and variations can be made in the described systems and methods as well as in the construction of this present solution without departing from the scope or spirit of the present solution.

The present solution has been described in relation to particular embodiments and examples which are intended in all aspects to be illustrative rather than restrictive.

Moreover, other implementations of the present solution will be apparent to the skilled person from consideration of the specification and practice of the present solution disclosed herein. It is intended that the specification and the examples be considered as exemplary only. To this end, it is to be understood that inventive aspects lie in less than all features of the foregoing disclosed implementation or configuration. Thus, the true scope and spirit of the present solution is indicated by the following claims.

What is claimed is:

1. A classification apparatus configured to perform a classification using a neural network with at least one hidden layer and an output layer, the classification apparatus comprising:
 a coarse training unit configured to train the neural network on a subset of neurons of a last hidden layer and a set of neurons of the output layer; and
 a fine training unit configured to train the neural network on a set of the last hidden layer and a subset of neurons of the output layer, the subset of neurons of the last hidden layer comprising a smaller number of neurons than the set of neurons of the last hidden layer, and the subset of neurons of the output layer comprising a smaller number of neurons than the set of neurons of the output layer.

2. The classification apparatus of claim 1, further comprising
 a determination unit configured to determine the subset of neurons of the output layer;
 wherein the fine training unit is configured to train the neural network on the set of neurons of the last hidden layer and the determined subset of neurons of the output layer.

3. The classification apparatus of claim 2,
 wherein, during training by the coarse training unit, each neuron of the output layer is assigned to a coarse probability, the coarse probability being an output result of the coarse training unit.

4. The classification apparatus of claim 3,
 wherein the determination unit is configured to determine the subset of neurons of the output layer based on the coarse probabilities of the neurons of the output layer.

5. The classification apparatus of claim 4,
 wherein the determination unit is configured to partition the set of neurons of the output layer in a first subset and in a second subset, each neuron of the first subset having a higher coarse probability than each neuron of the second subset.

6. The classification apparatus of claim 5,
 wherein the fine training unit is configured to select the first subset and to train the neural network on the set of neurons of the last hidden layer and the selected first subset.

7. The classification apparatus of claim 3
 wherein the fine training unit is configured to assign a fine probability to each neuron of the output layer in the subset of neurons of the output layer, the fine probability having a higher probability distribution accuracy than a coarse probability and being an output result of the fine training unit.

8. The classification apparatus of claim 3,
wherein a part of the neurons of the output layer form a subset when a cumulative probability exceeds a threshold, the cumulative probability being determined by cumulating the coarse probabilities of the neurons.

9. The classification apparatus of claim 3,
wherein a parameter for setting the number of neurons in the subset of neurons of the last hidden layer is automatically determined in a separate training model, the number of neurons in the subset of neurons of the last hidden layer used by the coarse training unit.

10. The classification apparatus of claim 1, further comprising
a calculation unit configured to calculate weights of the neural network using output results of the coarse training unit and the fine training unit;
wherein the calculation unit is configured to calculate the weights of the neural network using, as the output results, the coarse probabilities and the fine probabilities assigned to the respective neurons of the output layer;
wherein the weights of the neural network are calculated with respect to optimizing a joint loss function, the joint loss function being a weighted sum of a loss function of the coarse training unit and a loss function of the fine training unit.

11. The classification apparatus of claim 1, wherein the neural network is a recurrent neural network, a transformer network, a long short-term memory, LSTM, network, a convolutional neural network, or a multilayer perceptron.

12. The classification apparatus of claim 1,
wherein the classification apparatus is configured to perform language classification and/or speech recognition.

13. The classification apparatus of claim 12, wherein
the coarse training unit is configured to use a n-gram language model for language classification.

14. The classification apparatus of claim 1, wherein
the coarse training unit is configured to use hierarchical softmax or any other softmax-like activation function that outputs a valid probability distribution over words.

15. The classification apparatus of any of claim 1, wherein
the number of neurons of the last hidden layer in the subset for training the neural network by the coarse training unit or by the fine training unit is iteratively increased or decreased; or
the number of neurons of the output layer in the subset for training the neural network by the fine training unit is iteratively increased or decreased.

16. A classification method for performing a classification using a neural network with at least one hidden layer and an output layer, the classification method comprising:
a coarse step of training the neural network on a subset of neurons of a last hidden layer and a set of neurons of the output layer; and
a fine step of training the neural network on a set of neurons of the last hidden layer and a subset of neurons of the output layer, the subset of neurons of the last hidden layer comprising a smaller number of neurons than the set of neurons of the last hidden layer, and the subset of neurons of the output layer comprising a smaller number of neurons than the set of neurons of the output layer.

* * * * *